United States Patent
Roh et al.

(10) Patent No.: US 10,533,112 B2
(45) Date of Patent: Jan. 14, 2020

(54) HEAVY-DUTY EPOXY COATING COMPOSITION INCLUDING STYRENATED PHENOL AND METHOD OF PREPARING THE SAME

(71) Applicant: Korea Kumho Petrochemical Co., Ltd., Seoul (KR)

(72) Inventors: Kee Yoon Roh, Daejeon (KR); Jung Hee Jang, Daejeon (KR); Je-young Park, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 103 days.

(21) Appl. No.: 15/286,879

(22) Filed: Oct. 6, 2016

(65) Prior Publication Data

US 2017/0096578 A1 Apr. 6, 2017

(30) Foreign Application Priority Data

Oct. 6, 2015 (KR) .......................... 10-2015-0140214

(51) Int. Cl.
*C09D 163/00* (2006.01)
*C08G 59/62* (2006.01)

(52) U.S. Cl.
CPC ......... *C09D 163/00* (2013.01); *C08G 59/621* (2013.01)

(58) Field of Classification Search
CPC ....... C09D 163/00; C09D 7/20; C08G 59/621
USPC ....................................................... 523/456
See application file for complete search history.

(56) References Cited

U.S. PATENT DOCUMENTS

| 2009/0005478 A1* | 1/2009 | Gelbin .................. C08K 5/13 524/186 |
| 2012/0172493 A1 | 7/2012 | Dettloff et al. |
| 2016/0207859 A1 | 7/2016 | Roh et al. |

FOREIGN PATENT DOCUMENTS

| KR | 10-2011-0070081 | 6/2011 |
| KR | 10-2012-0065836 | 6/2012 |
| KR | 10-2012-0094163 | 8/2012 |
| KR | 10-2014-0002989 | 1/2014 |
| KR | 10-2014-0002990 | 1/2014 |
| KR | 10-2014-0008801 | 1/2014 |
| WO | 2015/076440 | 5/2015 |

OTHER PUBLICATIONS

Kim et al., KR 10-2014-0008801 A machine translation in English, Jan. 22, 2014 (Year: 2014).*

* cited by examiner

*Primary Examiner* — David T Karst
(74) *Attorney, Agent, or Firm* — H.C. Park & Associates, PLC

(57) ABSTRACT

A heavy-duty epoxy coating composition including an epoxy resin, as a main substance, and styrenated phenol represented by Formula 1:

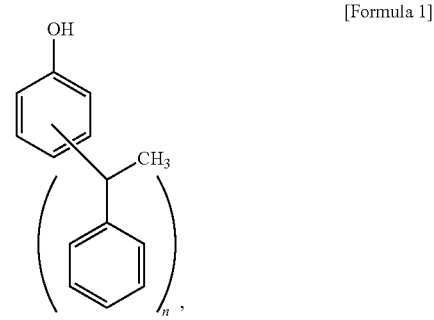

[Formula 1]

wherein n is an integer of 1 to 3.

10 Claims, 2 Drawing Sheets

[FIG. 1]
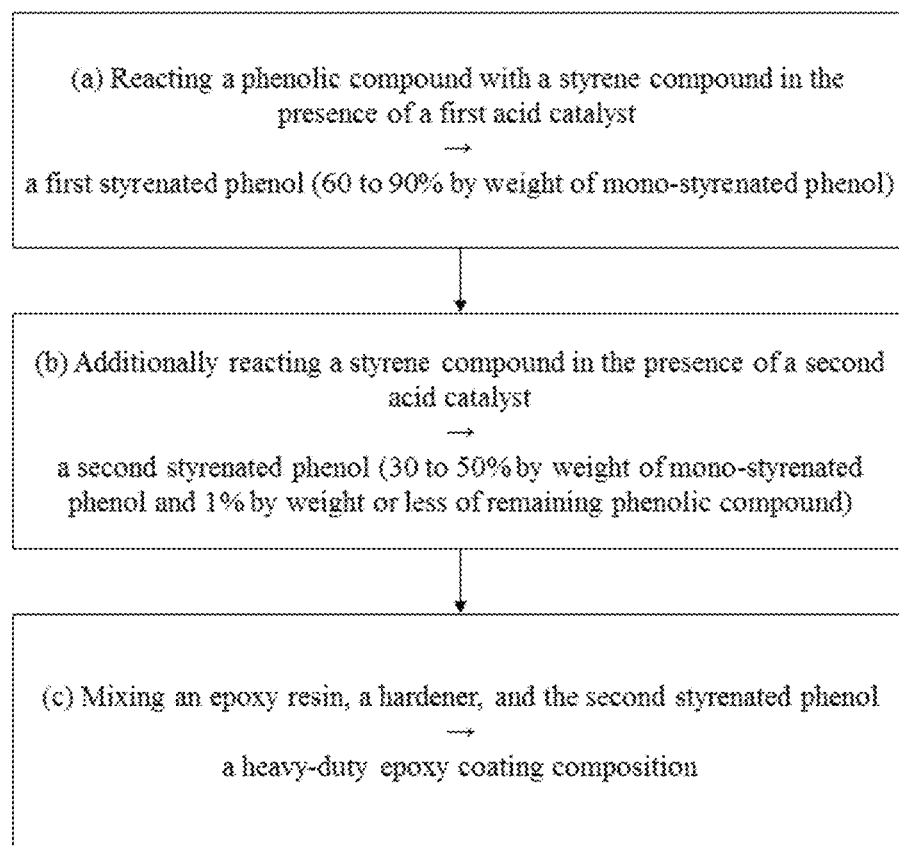

[FIG. 2]
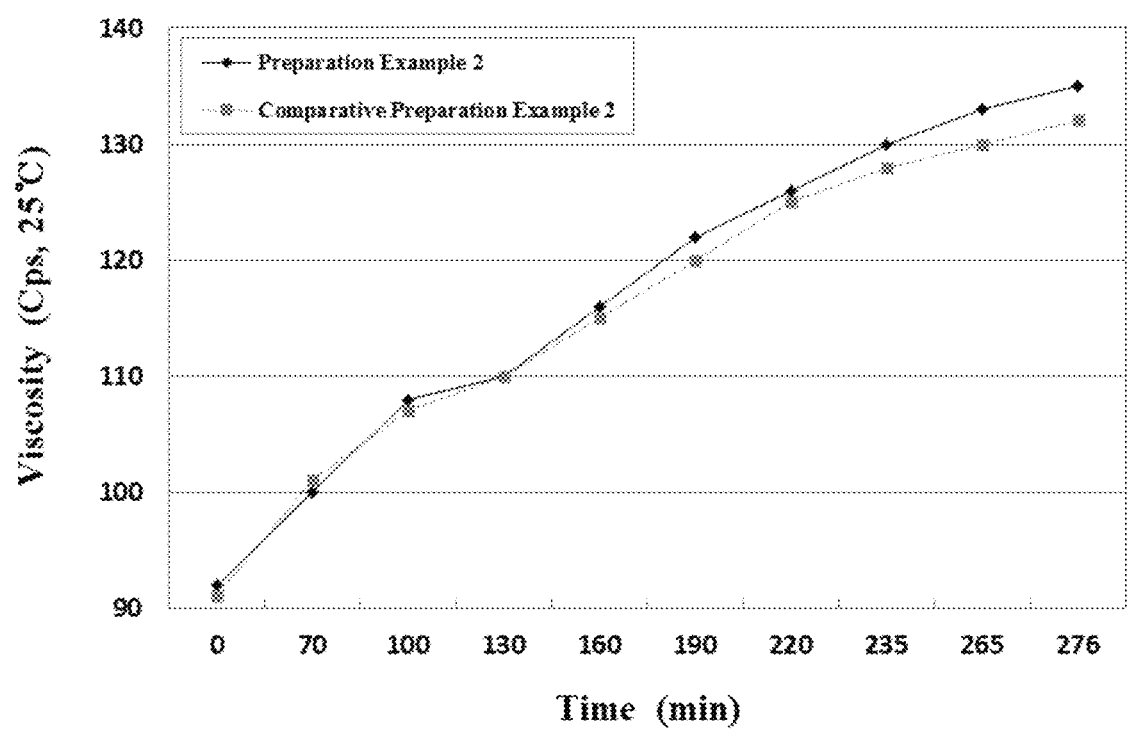

HEAVY-DUTY EPOXY COATING COMPOSITION INCLUDING STYRENATED PHENOL AND METHOD OF PREPARING THE SAME

CROSS-REFERENCE TO RELATED APPLICATION

This application claims priority from and the benefit of Korean Patent Application No. 10-2015-0140214, filed on Oct. 6, 2015, which is hereby incorporated by reference for all purposes as if fully set forth herein.

BACKGROUND

Field

The present invention relates to a heavy-duty epoxy coating composition including styrenated phenol and a method of preparing the same.

Discussion of the Background

Conventionally, various nonreactive ingredients including alkylphenolic compounds, such as nonylphenol, dodecyl phenol, and octylphenol, $C_5$-$C_9$ hydrocarbon resins, and oligomers of phenol and α-methylstyrene have been added as a plasticizer or a diluent for heavy duty epoxy coating.

In particular, alkylphenolic compounds have been widely used as additives for heavy-duty epoxy coating or surfactants requiring plasticity. However, alkylphenolic compounds were reported as substances that are toxic to the kidneys and disrupt the endocrine system. Accordingly, the use of such alkylphenolic compounds is prohibited and a use range thereof has gradually decreased globally.

In addition, since hydrocarbon resins are not monomer compounds, the use thereof is very limited. In addition, the structures of oligomers of phenol and α-methylstyrene are very complex and the content of each thereof is not uniform.

Further, when the compounds are mixed with a heavy duty epoxy coating material to use as a plasticizer and a nonreactive diluent, a drying time is slow or irregular and, after use of the mixtures, volatile organic compounds (VOC), such as benzene, xylene, and other petroleum-based compounds, remain in a large amount, thereby having a negative influence upon the environment.

SUMMARY

Therefore, the present invention has been made in view of the above problems, and it is an object of the present invention to provide a heavy-duty epoxy coating composition having superior workability and shortening a drying time after coating and a method of preparing the same.

Additional features of the invention will be set forth in the description which follows, and in part will be apparent from the description, or may be learned by practice of the invention.

In accordance with exemplary embodiments of the present invention, the above and other objects can be accomplished by the provision of a heavy-duty epoxy coating composition including an epoxy resin, as a main substance, and styrenated phenol represented by Formula 1 below:

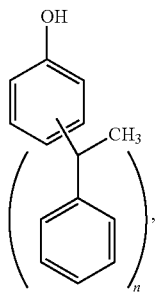

[Formula 1]

wherein n is an integer of 1 to 3.

In an exemplary embodiment, the styrenated phenol may include mono-styrenated phenol, di-styrenated phenol, and tri-styrenated phenol, and the content of the mono-styrenated phenol may be 30 to 50% by weight based on a total weight of the styrenated phenol.

In an exemplary embodiment, the styrenated phenol may be a hardener of the heavy-duty epoxy coating composition and the content of the styrenated phenol may be 1 to 30% by weight based on a total weight of the heavy-duty epoxy coating composition.

In an exemplary embodiment, the styrenated phenol may be a nonreactive diluent of the epoxy resin, as a main substance, and the content of the styrenated phenol may be 1 to 30 parts by weight based on 100 parts by weight of the epoxy resin, as a main substance.

In accordance with another exemplary embodiment of the present invention, there is provided a method of preparing a heavy-duty epoxy coating composition, the method including: (a) a step of preparing a first styrenated phenol by reacting a phenolic compound with a styrene compound in the presence of a first acid catalyst; (b) a step of preparing a second styrenated phenol by additionally reacting a product from step (a) with a styrene compound in the presence of a second acid catalyst; and (c) a step of mixing an epoxy resin with the second styrenated phenol.

In an exemplary embodiment, the first acid catalyst may be a phosphoric acid catalyst.

In an exemplary embodiment, the first styrenated phenol may include mono-styrenated phenol, di-styrenated phenol, and tri-styrenated phenol, and the content of the mono-styrenated phenol may be 60 to 90% by weight based on a total weight of the first styrenated phenol.

In an exemplary embodiment, the second acid catalyst may be one or more selected from the group consisting of sulfuric acid, p-toluenesulfonic acid, methanesulfonic acid, nitric acid, hydrochloric acid, clay, and ion exchange resin.

In an exemplary embodiment, an equivalence ratio of the second acid catalyst:the phenolic compound may be 0.0001 to 0.01:1.

In an exemplary embodiment, an equivalence ratio of the phenolic compound:the styrene compound additionally added in step (b) may be 1:0.1 to 1.

In an exemplary embodiment, in step (c), 1 to 30% by weight of the second styrenated phenol may be mixed based on a total weight of the heavy-duty epoxy coating composition.

In an exemplary embodiment, in step (c), 1 to 30 parts by weight of the second styrenated phenol may be mixed based on 100 parts by weight of the epoxy resin.

In an exemplary embodiment, the second styrenated phenol may include mono-styrenated phenol, di-styrenated phenol, and tri-styrenated phenol, and the content of the mono-styrenated phenol may be 30 to 50% by weight based on a total weight of the second styrenated phenol.

In an exemplary embodiment, the content of an unreacted remaining phenolic compound of the second styrenated phenol may be 1% by weight or less.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 1 schematically illustrates a method of preparing a heavy-duty epoxy coating composition according to an exemplary embodiment of the present invention.

FIG. 2 schematically illustrates measurement results of the pot life of a heavy-duty epoxy coating composition according to an exemplary embodiment of the present invention.

DETAILED DESCRIPTION OF THE ILLUSTRATED EMBODIMENTS

Hereinafter, exemplary embodiments of the present disclosure will be described in detail with reference to the accompanying drawings. Throughout the specification, like reference numerals denote like elements having the same or similar functions. Detailed description of components or functions apparent to those skilled in the art will be omitted for clarity. It should be understood that the following exemplary embodiments are provided by way of example and that the present disclosure is not limited to the exemplary embodiments disclosed herein and can be implemented in different forms by those skilled in the art.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

The terminology used herein is for the purpose of describing particular exemplary embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

An exemplary embodiment of the present invention provides a heavy-duty epoxy coating composition including an epoxy resin, as a main substance, and styrenated phenol represented by Formula 1 below:

[Formula 1]

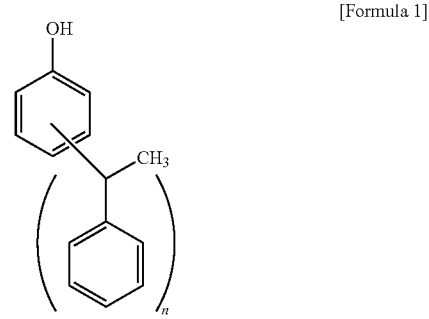

wherein n is an integer of 1 to 3.

The term "heavy-duty epoxy coating material" used in the present specification refers to a coating material for protecting bridges, sea structures, power generators, large structures of plants, ships, containers, or other iron structures exposed to severely corrosive environments for a long time and can be understood as a concept different from general epoxy coating materials used in home appliances or building exteriors.

The styrenated phenol may include mono-styrenated phenol, di-styrenated phenol, and tri-styrenated phenol, and the content of the mono-styrenated phenol may be 30 to 50% by weight based on a total weight of the styrenated phenol.

In addition, the styrenated phenol may be a hardener of the heavy-duty epoxy coating composition and the content of the styrenated phenol may be 1 to 30% by weight based on a total weight of the heavy-duty epoxy coating composition. Here, the styrenated phenol may be a hardener that directly hardens the epoxy resin composition included in the epoxy main substance. Alternatively, the styrenated phenol may be used with a separate hardener and thus may function as a hardening accelerator for doubling the hardening performance and speed of the separate hardener.

When the content of the styrenated phenol, as a hardener, is less than 1% by weight based on a total weight of the heavy-duty epoxy coating composition, hardening acceleration effect on the heavy-duty coating composition may be minimal. When the content of the styrenated phenol is greater than 30% by weight based on a total weight of the heavy-duty epoxy coating composition, the durability and adhesive strength of the epoxy resin, as a main substance, may be decreased.

Meanwhile, the styrenated phenol may be a nonreactive diluent of the epoxy resin, as a main substance, and the content of the styrenated phenol may be 1 to 30 parts by weight based on 100 parts by weight of the epoxy resin, as a main substance. When the content of the styrenated phenol, as a nonreactive diluent, is less than 1 part by weight based on 100 parts by weight of the epoxy resin, as a main substance, plasticity and dilution effects on the epoxy resin composition may be minimal. When the content of the styrenated phenol is greater than 30 parts by weight based on 100 parts by weight of the epoxy resin, the durability and adhesive strength of the epoxy resin, as a main substance, may be decreased.

In conventional epoxy coating compositions prepared by mixing a main substance composed of an epoxy resin with a hardener portion, styrenated phenol was used as one ingredient of the hardener portion. However, the styrenated phenol used in the hardener portion includes 50% by weight or more of mono-styrenated phenol to provide hardenability to the coating composition by being mixed with the main substance upon preparation of the epoxy coating composition. Accordingly, the addition of the styrenated phenol is irrelevant to the plasticity and workability of the epoxy resin itself, as a main substance, of the epoxy coating composition.

That is, when the styrenated phenol in which the content of mono-styrenated phenol is 30 to 50% by weight is used as a nonreactive diluent or a hardener of the epoxy resin composition, as a main substance, of the heavy-duty epoxy coating composition, viscosity is decreased and thus, upon mixing and coating, workability, flowability, and self-leveling may be improved. In addition, a hydroxyl value (OH value) may be maintained in a state similar to conventional nonylphenol value (240 to 25), whereby hardening reaction may be facilitated and a drying time at room temperature may be shortened.

FIG. 1 illustrates a method of preparing a heavy-duty epoxy coating composition according to an exemplary embodiment of the present invention. Referring to FIG. 1, a method of preparing the heavy-duty epoxy coating composition according to another exemplary embodiment of the present invention may include (a) a step of preparing a first styrenated phenol by reacting a phenolic compound with a styrene compound in the presence of a first acid catalyst; (b) a step of preparing a second styrenated phenol by additionally reacting a product from step (a) with a styrene compound in the presence of a second acid catalyst; and (c) a step of mixing an epoxy resin with the second styrenated phenol.

In steps (a) and (b), the phenolic compound and the styrene compound are alkylated in the presence of an acid catalyst, thereby preparing styrenated phenol. Here, mono-styrenated phenol (MSP) in which one styrene compound is substituted with an ortho or para position of a phenolic compound, di-styrenated phenol (DSP) in which two styrene compounds are bound to ortho-para or ortho-ortho positions of a phenolic compound, and tri-styrenated phenol (TSP) in which three styrene compounds are bound to ortho-para positions of a phenolic compound may be generated. A ratio among the generated products may be different depending upon a used catalyst type or reaction temperature.

The phenolic compound and the styrene compound, as reactants, may be used alone or as a mixture with a derivative thereof. Accordingly, a wider variety of styrenated phenols may be prepared.

In particular, the phenolic compound may be one or more selected from the group consisting of phenol, o-cresol, m-cresol, p-cresol, 2,5-xylenol, 3,5-xylenol, 3,4-xylenol, 2,3-xylenol, o-ethylphenol, m-ethylphenol, p-ethylphenol, p-tert-butylphenol, p-octylphenol, m-methoxyphenol, p-methoxyphenol, 3,4-dimethoxyphenol, 2-methoxy-4-methylphenol, m-ethoxyphenol, p-ethoxyphenol, m-propoxyphenol, p-propoxyphenol, m-butoxyphenol, p-butoxyphenol, 2-methyl-4-isopropylphenol, o-chlorophenol, m-chlorophenol, p-chlorophenol, dihydroxybiphenyl, bisphenolA, phenylphenol, resorcinol, and naphthol.

In addition, the styrene compound may be one or more selected from the group consisting of styrene, α-methylstyrene, o-methylstyrene, m-methylstyrene, p-methylstyrene, tert-butylstyrene, α-methylvinyltoluene, dimethylstyrene, chlorostyrene, dichlorostyrene, bromostyrene, dibromostyrene, and vinylnaphthalene.

In step (a), the first styrenated phenol including mono-styrenated phenol, di-styrenated phenol, and tri-styrenated phenol may be generated through alkylation of the phenolic compound and the styrene compound. In particular, in step (a), the content of the mono-styrenated phenol in the first styrenated phenol may be increased to a range of 60 to 90% by weight by exclusively applying a phosphoric acid catalyst to the alkylation.

Since the alkylation between the phenolic compound and the styrene compound is an exothermic reaction, temperature increases during alkylation. Accordingly, alkylation may be carried out in a temperature range of 120 to 200° C., preferably, in a temperature range of 140 to 170° C.

In general, the size of the phosphoric acid catalyst, due to the molecular structural characteristic of the phosphoric acid catalyst, is larger than that of a sulfuric acid catalyst exhibiting superior activity, and the activity of the phosphoric acid catalyst is lower than that of the sulfuric acid catalyst. Accordingly, a reaction temperature of the phosphoric acid catalyst is relatively high compared to the sulfuric acid catalyst.

However, since the phosphoric acid catalyst has superior selectivity compared to the sulfuric acid catalyst, a composition ratio of styrenated phenol generated using the phosphoric acid catalyst is different from that of styrenated phenol generated using the sulfuric acid catalyst. In particular, a first styrenated phenol in which the content of the mono-styrenated phenol, in which 4' position of the phenolic compound is substituted with one styrene compound, is 60 to 90% by weight, preferably 65 to 80% by weight based on a total weight of a product may be obtained.

In step (b), the mono-styrenated phenol and the di-styrenated phenol in the first styrenated phenol may be additionally alkylated by additionally adding a styrene compound in the presence of a catalyst different from the first acid catalyst. In addition, a phenolic compound remaining after implementation of step (a) may be alkylated.

That is, the mono-styrenated phenol in the first styrenated phenol is converted into di or tri-styrenated phenol by adding only the styrene compound without addition of the phenolic compound, whereby the content of mono-styrenated phenol in the first styrenated phenol may be reduced.

Since alkylation between the phenolic compound and the styrene compound corresponds to exothermic reaction, temperature is elevated during the alkylation. Accordingly, the alkylation may be carried out in a temperature range of 90 to 180° C., preferably, in a temperature range of 120 to 160° C.

In step (b), the second styrenated phenol including mono-styrenated phenol, di-styrenated phenol, and tri-styrenated phenol may be generated by alkylation between the styrene compound and the first styrenated phenol and alkylation between the styrene compound and the remaining phenolic compound. Here, since the alkylation between the styrene compound and the first styrenated phenol is relatively dominant, the content of mono-styrenated phenol in the second styrenated phenol may be decreased to 30 to 50% by weight, compared to the first styrenated phenol.

When the second styrenated phenol in which the content of a mono-styrenated phenol is 30 to 50% by weight is used as a hardener or a nonreactive diluent of the epoxy resin composition, as a main substance, of the heavy-duty epoxy coating composition, viscosity is decreased and thus, upon mixing and coating, workability, flowability, and self-leveling may be increased. In addition, a hydroxyl value (OH value) may be maintained in a state similar to a conventional nonylphenol value (240 to 25), whereby hardening reaction may be facilitated and a drying time at room temperature may be shortened.

In addition, in step (b), the content of an unreacted remaining phenolic compound in the second styrenated phenol may be decreased to 1% by weight or less depending upon an addition time of the styrene compound and a used catalyst type. Accordingly, process efficiency and economic feasibility may be increased.

Here, the second acid catalyst may be one or more selected from the group consisting of sulfuric acid, p-toluenesulfonic acid, methanesulfonic acid, nitric acid, hydrochloric acid, clay, and an ion exchange resin. Preferably, the second acid catalyst is sulfuric acid.

An equivalence ratio of the second acid catalyst:the phenolic compound, as a reactant, may be 0.0001 to 0.01:1, preferably, 0.0001 to 0.002:1. When the ratio of the equivalents of the second acid catalyst to the equivalents of the phenolic compound is less than 0.0001, removal effect of an unreacted remaining phenolic compound may be small. When the ratio of the equivalents of the second acid catalyst to the equivalents of the phenolic compound is greater than 0.01, isolation and collection of a product might not be easy.

In addition, an equivalence ratio of the phenolic compound:the styrene compound additionally added in step (b) may be 1:0.1 to 1, preferably, 1:0.3 to 0.5. When the ratio of the equivalents of the styrene compound to the equivalents of the phenolic compound is less than 0.1, removal effect of an unreacted remaining phenolic compound is small. When the ratio of the equivalents of the styrene compound to the equivalents of the phenolic compound is greater than 1, an unreacted remaining styrene compound is generated and thus process efficiency may be decreased.

After terminating the alkylation of step (b), neutralization reaction is performed by adding an aqueous basic solution, and then a resultant solution is vacuum-evaporated to remove moisture therefrom. Subsequently, a neutralized salt is removed from a filter, thereby obtaining a filtered styrenated phenol.

The aqueous basic solution may be one or more selected from the group consisting of an aqueous sodium carbonate solution, an aqueous potassium carbonate solution, an aqueous sodium hydroxide solution, and an aqueous potassium hydroxide solution, but any solution enabling neutralization under mild conditions may be used.

In step (c), the heavy-duty epoxy coating composition may be prepared by mixing the epoxy resin with the second styrenated phenol.

Here, the second styrenated phenol is mixed in an amount of 1 to 30% by weight based on a total weight of the heavy-duty epoxy coating composition, thereby being used as a hardener of the heavy-duty epoxy coating composition.

In addition, the second styrenated phenol is mixed in an amount of 1 to 30 parts by weight based on 100 parts by weight of the epoxy resin, thereby being used as a nonreactive diluent of the epoxy resin, as a main substance.

Types and the contents of the epoxy resin and the second styrenated phenol are provided above.

Hereinafter, the present invention is described in detail with reference to examples.

Example 1

A phosphoric acid catalyst (0.625 g, 0.006 eq) was added to phenol (100 g, 1 eq), and then styrene (127.3 g, 1.15 eq) was added thereto dropwise for two hours until temperature was elevated from 140° C. to 170° C. After completing the addition of the styrene, reaction was further performed at the same temperature for one hour. Subsequently, reaction temperature was lowered to 150° C. and a sulfuric acid catalyst (0.019 g, 0.00018 eq) was added to the mixture, and then styrene (55.35 g, 0.5 eq) was additionally added thereto dropwise for 30 minutes. After completing the addition of the styrene, reaction was further performed at the same temperature for one hour, thereby obtaining a solution including styrenated phenol.

Subsequently, neutralization was performed for 30 minutes while adding sodium carbonate (0.698 g, 0.0062 eq) dissolved in distilled water to the obtained solution at 100° C. Moisture of a resultant solution was removed through vacuum evaporation and a neutralized salt was removed through filtration. As a result, purified styrenated phenol was obtained.

Example 2

Styrenated phenol was prepared in the same manner as in Example 1, except that p-toluenesulfonic acid (0.036 g, 0.00018 eq), instead of a sulfuric acid catalyst, was used as a catalyst.

Example 3

Styrenated phenol was prepared in the same manner as in Example 1, except that methanesulfonic acid (0.018 g, 0.00018 eq), instead of a sulfuric acid catalyst, was used as a catalyst.

Comparative Example 1

A sulfuric acid catalyst (0.188 g, 0.0018 eq) was added to phenol (100 g, 1 eq), and then styrene (133 g, 1.2 eq) was slowly added thereto dropwise for two hours until temperature was elevated from 90° C. to 95° C. After completing the addition of the styrene, reaction was further preformed at the same temperature for one hour, thereby obtaining a solution including styrenated phenol.

Subsequently, neutralization was performed for 30 minutes while adding sodium carbonate (0.203 g, 0.0018 eq) dissolved in distilled water to the obtained solution at 100°

C. Moisture of a resultant solution was removed through vacuum evaporation and a neutralized salt was removed through filtration. As a result, purified styrenated phenol was obtained.

Comparative Example 2

Styrenated phenol was prepared in the same manner as in Comparative Example 1, except that polyphosphoric acid (4.7 g), instead of the sulfuric acid catalyst, was used as a catalyst.

Comparative Example 3

Styrenated phenol was prepared in the same manner as in Comparative Example 1, except that p-toluenesulfonic acid (0.364 g), instead of the sulfuric acid catalyst, was used as a catalyst.

Comparative Example 4

Styrenated phenol was prepared in the same manner as in Comparative Example 1, except that methanesulfonic acid (0.182 g), instead of the sulfuric acid catalyst, was used as a catalyst.

Comparative Example 5

Styrenated phenol was prepared in the same manner as in Comparative Example 1, except that clay (0.56 g), instead of the sulfuric acid catalyst, was used as a catalyst.

Comparative Example 6

Styrenated phenol was prepared in the same manner as in Comparative Example 1, except that an ion exchange resin (0.38 g), instead of the sulfuric acid catalyst, was used as a catalyst.

Experimental Example 1: Analysis of Compositions of Products Depending Upon Catalyst Types and Preparation Methods To analyze the compositions of styrenated phenols obtained according to Examples 1 to 3 and Comparative Examples 1 to 6, gas chromatography (GC) was performed. Results are summarized in Table 1 below.

TABLE 1

| Classification | Analysis object | GC analysis (peak area %) | | | | |
|---|---|---|---|---|---|---|
| | | Remaining styrene | Remaining phenol | MSP | DSP | TSP |
| Example 1 | Intermediate product | 1.55 | 2.86 | 77.59 | 15.12 | 0.38 |
| | Final product | 0 | 0.05 | 41.03 | 47.24 | 8.22 |
| Example 2 | Intermediate product | 4.83 | 6.15 | 69.07 | 17.34 | 0.51 |
| | Final product | 0.42 | 0.39 | 41.93 | 45.47 | 8.56 |
| Example 3 | Intermediate product | 3.02 | 4.51 | 74.33 | 14.50 | 0.61 |
| | Final product | 0.09 | 0.06 | 43.89 | 44.47 | 7.15 |
| Comparative Example 1 | Final product | 0 | 8.10 | 39.05 | 40.54 | 11.94 |
| Comparative Example 2 | Final product | 0 | 8.13 | 39.38 | 41.42 | 10.91 |
| Comparative Example 3 | Final product | 0 | 7.40 | 37.60 | 41.34 | 12.15 |
| Comparative Example 4 | Final product | 0 | 7.74 | 38.33 | 42.10 | 11.55 |
| Comparative Example 5 | Final product | 0 | 7.59 | 37.62 | 42.81 | 11.90 |
| Comparative Example 6 | Final product | 0 | 8.01 | 38.20 | 42.17 | 11.06 |

Referring to Table 1, it can be confirmed that, in the styrenated phenols of Examples 1 to 3, and Comparative Examples 1 to 5, the content of the mono-styrenated phenol in a product is adjusted in a range of 30 to 50% by weight. In addition, it can be confirmed that, while the content of unreacted remaining phenol is 7% by weight or more in the styrenated phenols prepared according to Comparative Examples 1 to 6, the content of unreacted remaining phenol is 1% by weight or less in the styrenated phenols prepared according to Examples 1 to 3. Accordingly, it can be confirmed that the efficiency of the styrenated phenol preparation process was greatly improved.

Preparation Example 1

A heavy-duty epoxy coating composition including an epoxy resin (KER 880), a hardener (KCA 4304), and the styrenated phenol of Example 1, as a nonreactive diluent, was prepared. A particular mix ratio is shown in Table 2 below.

TABLE 2

| Constituents | Content (% by weight) |
|---|---|
| Epoxy resin (KER 880) | 60.793 |
| Hardener (KCA 4304) | 35.643 |
| Unreactive diluent (styrenated phenol) | 3.564 |

Preparation Example 2

A heavy-duty epoxy coating composition including an epoxy resin (containing KER 3001-X-75, Xylene 25%), a hardener (containing KCA 2230-70, Xylene 20%), and the styrenated phenol of Preparation Example 1, as a nonreactive diluent, was prepared. A particular mix ratio is shown in Table 3 below.

TABLE 3

| Constituents | Content (% by weight) |
|---|---|
| Epoxy resin (containing KER 3001-X-75, Xylene 25%) | 67.732 |
| Hardener (containing KCA 2230-X-70, Xylene 30%) | 26.890 |
| Unreactive diluent (containing styrenated phenol) | 5.378 |

Comparative Preparation Example 1

A heavy-duty epoxy coating composition was prepared in the same manner as in Preparation Example 1, except that oligomers of phenol and α-methylstyrene were used as nonreactive diluents.

Comparative Preparation Example 2

A heavy-duty epoxy coating composition was prepared in the same manner as in Preparation Example 2, except that oligomers of phenol and α-methylstyrene were used as nonreactive diluents.

Experimental Example 2: Measurement of Drying Time of Heavy-Duty Epoxy Coating Compositions To measure drying time, a cell for coating (thickness 200 μm) was disposed on a glass plate (width: 30 cm, height: 2.5 cm), and the heavy-duty epoxy coating composition according to each of Preparation Examples 1 and 2 and Comparative Preparation Examples 1 and 2 was poured into the cell. Subsequently, the cell was rubbed from an upper part of the glass plate to a lower part thereof such that the heavy-duty epoxy coating composition was coated on the glass plate. Subsequently, a drying time recorder was set to perform 12-hour measurement and, after marking a start point, a drying time was measured at room temperature. Results are summarized in Table 4 below.

TABLE 4

| Classification | Dry time |
| --- | --- |
| Preparation Example 1 | 4 hr and 40 min |
| Preparation Example 2 | 8 hr and 20 min |
| Comparative Preparation Example 1 | 5 hr |
| Comparative Preparation Example 2 | 9 hr and 20 min |

Referring to Table 4, it can be confirmed that the drying time of the heavy-duty epoxy coating compositions of Preparation Examples 1 and 2, in which styrenated phenol is used as a nonreactive diluent, are respectively decreased by about 10% to 12%, compared to those of the heavy-duty epoxy coating compositions of Comparative Preparation Examples 1 and 2 in which the oligomers of phenol and α-methylstyrene are used.

Experimental Example 3: Measurement of Pot Life of Heavy-Duty Epoxy Coating Compositions Pot life refers to a time for which two or more ingredients maintain suitable fluidity, without being gelatinized or hardened, upon the preparation of a coating composition. The pot life may be measured by observing time-dependent viscosity change at 25° C. by means of a rotational viscometer (Brookfield HAT viscometer).

The pot life of the heavy-duty epoxy coating composition according to each of Preparation Example 2 and Comparative Preparation Example 2 was measured and results thereof are illustrated in FIG. 2. Referring to FIG. 2, the pot life of the heavy-duty epoxy coating composition of Preparation Example 2, in which styrenated phenol is used as a nonreactive diluent, is similar to that of the heavy-duty epoxy coating composition of Comparative Preparation Example 2 in which the oligomers of phenol and α-methylstyrene are used. Accordingly, it can be confirmed that a viscosity change characteristic and workability of the heavy-duty epoxy coating composition of Preparation Example 2 are similar to those of the heavy-duty epoxy coating composition of Comparative Preparation Example 2.

According to an exemplary of the present invention, when styrenated phenol including a predetermined amount of mono-styrenated phenol is used as a hardener or a nonreactive diluent for a heavy-duty epoxy coating composition, workability can be improved and a drying time after coating can be shortened.

Effects of the present invention are not limited to the aforementioned effects and should be understood as including all effects construed by the constructions disclosed in the detailed description or claims of the present invention.

The aforementioned description of the present invention is provided by way of example and those skilled in the art will understood that the present invention can be changed or modified into other specified forms without change or modification of the technical spirit or essential characteristics of the present invention. Therefore, it should be understood that the aforementioned examples are only provided by way of example and not provided to limit the present invention. For example, each of constituents described as a single form may be separately implemented and, similarly, constituents described as being separated may be implemented in a combined form.

It should be understood that the scope of the present invention is defined by the following claims and the invention is to cover all modifications, equivalents, and alternatives falling within the spirit and scope of the invention as defined by the claims.

What is claimed is:

1. A heavy-duty epoxy coating composition comprising an epoxy resin, as a main substance, and styrenated phenol represented by Formula 1 below:

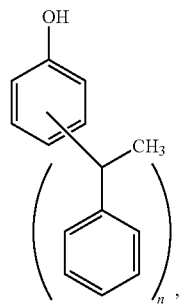

[Formula 1]

wherein n is an integer of 1 to 3,
wherein the styrenated phenol comprises mono-styrenated phenol, di-styrenated phenol, and tri-styrenated phenol,
a content of the mono-styrenated phenol is 41 to 44% by weight based on a total weight of the styrenated phenol, and
a content of unreacted remaining phenol is 1% by weight or less in the styrenated phenol.

2. The heavy-duty epoxy coating composition according to claim 1, wherein the styrenated phenol is a hardener of the heavy-duty epoxy coating composition and a content of the styrenated phenol is 1 to 30% by weight based on a total weight of the heavy-duty epoxy coating composition.

3. The heavy-duty epoxy coating composition according to claim 1, wherein the styrenated phenol is a nonreactive diluent of the epoxy resin, as a main substance, and a content of the styrenated phenol is 1 to 30 parts by weight based on 100 parts by weight of the epoxy resin, as a main substance.

4. A method of preparing the heavy-duty epoxy coating composition according to claim 1, the method comprising:
preparing a first styrenated phenol comprising mono-styrenated phenol, di-styrenated phenol, and tri-styrenated phenol by reacting a phenolic compound with a styrene compound in a presence of a first acid catalyst;

preparing a second styrenated phenol comprising mono-styrenated phenol, di-styrenated phenol, and tri-styrenated phenol by additionally reacting the first styrenated phenol with a styrene compound in a presence of a second acid catalyst; and mixing an epoxy resin with the second styrenated phenol.

5. The method according to claim 4, wherein the first acid catalyst is a phosphoric acid catalyst.

6. The method according to claim 4, wherein the second acid catalyst is one or more selected from the group consisting of sulfuric acid, p-toluenesulfonic acid, methanesulfonic acid, nitric acid, hydrochloric acid, clay, and ion exchange resin.

7. The method according to claim 4, wherein an equivalence ratio of the second acid catalyst:the phenolic compound is 0.0001 to 0.01:1.

8. The method according to claim 4, wherein an equivalence ratio of the phenolic compound:the styrene compound additionally added in the preparing of second styrenated phenol is 1:0.1 to 1.

9. The method according to claim 4, wherein, in the mixing of the epoxy resin, 1 to 30% by weight of the second styrenated phenol is mixed based on a total weight of the heavy-duty epoxy coating composition.

10. The method according to claim 4, wherein, in the mixing of the epoxy resin, 1 to 30 parts by weight of the second styrenated phenol is mixed based on 100 parts by weight of the epoxy resin.

* * * * *